United States Patent
Chi et al.

(10) Patent No.: US 6,454,270 B1
(45) Date of Patent: Sep. 24, 2002

(54) LOW LEAKAGE SNOUT SEALING SYSTEM

(75) Inventors: Wei-Ming Chi, Sunnyvale, CA (US); Norman Arnold Turnquist, Carlisle, NY (US); Christopher Edward Wolfe, Niskayuna, NY (US); Mark Arne Florin, Ballston Spa, NY (US); Mahmut Faruk Aksit, Troy, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/737,088

(22) Filed: Dec. 14, 2000

(51) Int. Cl.[7] ................................................ F16J 15/08
(52) U.S. Cl. ...................... 277/409; 277/500; 277/602; 277/603; 415/134
(58) Field of Search ................ 277/409, 500, 277/511, 602, 603, 606; 285/351, 121.4; 415/134, 170.1, 136

(56) References Cited

U.S. PATENT DOCUMENTS

| | | | | |
|---|---|---|---|---|
| 2,649,315 A | * | 8/1953 | Ipsen | 277/602 |
| 4,702,671 A | * | 10/1987 | Brinkman et al. | 277/606 |
| 4,850,794 A | * | 7/1989 | Reynolds et al. | 415/136 |
| 5,037,115 A | * | 8/1991 | Brandon | 277/606 |
| 5,433,453 A | * | 7/1995 | Dalton | 277/606 |
| 5,520,398 A | * | 5/1996 | Brandon | 277/409 |
| 5,628,617 A | * | 5/1997 | Dalton et al. | 277/615 |

* cited by examiner

Primary Examiner—Anthony Knight
Assistant Examiner—E. Peavey
(74) Attorney, Agent, or Firm—Nixon & Vanderhye

(57) ABSTRACT

A low leakage sealing system is provided between a steam pipe and a housing comprised of a pair of shells and a nozzle box movable relative to one another. The sealing system includes large and small diameter sealing rings engaging the pipe and shells or nozzle box and a secondary sealing element disposed between the sealing rings and one of the pipe and shells or nozzle box. The sealing elements comprise frustoconical elements having curved end surfaces forming primary seals with the sealing rings and the housing. In another form, the sealing system includes annular carrier elements having radially opening cavities for receiving sealing rings engageable with the pipe and housing, respectively. The carrier elements are axially spaced from a plurality of sealing rings to provide the low leakage sealing system.

11 Claims, 4 Drawing Sheets

LOW LEAKAGE SNOUT SEALING SYSTEM

BACKGROUND OF THE INVENTION

The present invention relates to a sealing system for steam turbines and particularly relates to a pipe or snout for flowing steam wherein the pipe is sealed to separate casings which have different magnitudes of thermal expansion relative to one another and hence are movable relative to one another and to the pipe.

Steam turbines require sealing systems that can prevent leakage between the steam in let snout and the surrounding distinct inner and outer shells and a nozzle box (hereafter sometimes collectively referred to as a housing). In current seal designs for this purpose, the seal system consists of sets of rings that seal between the inlet snout and each of the inner and outer shells and nozzle box. For example, for sealing in the annular s pac e between the snout and a shell, a plurality of sealing rings are axially stacked one against the other. Alternate sealing rings in the stack have large and small diameters, respectively. The smaller diameter sealing rings bear and seal against the exterior surface of the pipe or snout, while the larger diameter sealing rings bear and seal against the interior wall surface of the shell. Thus, with the rings alternately sealing radially against the snout and shell walls and sealing axially against one another at opposed axial sealing faces, relative movement between the parts is facilitated.

In one such prior sealing system, the smaller diameter sealing rings have a coefficient of thermal expansion less than the coefficient of thermal expansion of the snout whereby the snout expands a greater amount than the smaller sealing rings t o ensure a tight seal between the smaller diameter sealing rings and the snout wall as operating temperatures increase to steady state. In that same prior sealing system, the coefficient of thermal expansion of the larger diameter sealing rings is larger than the coefficient of thermal expansion of the outer shell such that the larger diameter rings expand more than the shell expands. This ensures a tight seal between the larger diameter sealing rings and the shell wall when the system heats up to operating temperature.

In these prior systems, however, there remain leakage paths due to the relative movement of the various parts of the system, e.g., misalignments and vibrations occur even at operating temperatures. Consequently, the sealing rings may lose contact with one another and/or the interfacing sealing component and yield significant leakage flow. With axially stacked sealing rings, the leakage flows may occur between the sealing rings and the snout or shell walls, or both, or between the axial sealing faces of the sealing rings per se. Accordingly, there is a need for a low leakage snout sealing system for steam turbines.

BRIEF SUMMARY OF THE INVENTION

In accordance with a preferred embodiment of the present invention, there is provided a hybrid sealing assembly for further reducing leakage flow in a snout sealing system. The system includes axially stacked sealing rings for engaging the snout and shell walls and one or more additional secondary sealing elements. In one form hereof, secondary sealing elements extend in the radial plane of each sealing ring and seals between the sealing ring and one of the snout wall and the shell wall, i.e., the housing. In another form hereof, a sealing element extends axially between axially spaced sealing rings and engages both the snout wall and housing. The secondary sealing element(s), while redundant to the- sealing rings, reinforce the leakage performance of the sealing system. The secondary sealing elements choke the leakage flow that escapes past the sealing rings to minimize or preclude leakage flow.

In a first preferred embodiment hereof, each secondary seal comprises a frustoconical, generally C-shaped, annular sealing element disposed between a sealing ring and an adjoining wall, i.e., either the snout wall or the shell wall. Each sealing element lies in the radial plane of the sealing ring against which it lies in sealing engagement. Thus, the sealing surface of the C-shaped element at its opposite ends engages the radially adjacent sealing ring and a snout or housing wall. In another preferred embodiment hereof, the frustoconical, generally C-shaped, annular sealing element is enlarged and extends axially between axially spaced sealing rings and radially between the walls of the snout and housing. In this form, the primary sealing surfaces are between the C-shaped element and walls of the snout and housing. Tertiary sealing also may occur from axially applied fluid, e.g., steam pressure on the frustoconical sealing element causing the sealing element to engage the axially adjacent sealing rings.

In a further form of the present invention, piston rings are disposed alternately between the radial sealing elements and the radially spaced wall. For example, a piston ring is disposed between the shell or nozzle box wall and a sealing ring engageable with the snout wall. At an adjacent axial position, a piston ring is disposed between the sealing ring and the snout wall.

In a still further preferred embodiment of the present invention, a plurality of piston ring carriers are axially stacked in the annular seal cavity between the snout and the shell or nozzle box and axially spaced from a plurality of sealing rings. Each piston ring carrier has a radial cavity for holding a piston ring. For example, the piston ring carrier at one end of the axial stack of sealing elements has a radially inwardly opening cavity for receiving a piston ring or rings for bearing against the snout wall. The next axially spaced piston ring carrier has a radially outwardly opening cavity for receiving a piston ring or rings engageable against the shell wall. The piston ring carriers seal axially one against the other with the piston rings sealing between the carriers and the walls of the snout and shell, respectively. The remaining sealing rings in the stack serve as secondary seals as previously described.

In a preferred embodiment according to the present invention, there is provided a low leakage sealing system for a turbine, comprising a pipe for flowing a heated fluid medium, a housing surrounding the pipe and spaced radially outwardly of the pipe defining an annular space therewith, a plurality of large and small-diameter sealing rings alternately disposed in the annular space about the axis for engagement with respective surfaces of the housing and the pipe to form seals therewith, the sealing rings engaging one another in an axial direction to form seals along adjoining axial faces thereof and at least one element disposed between one of the sealing rings and one of the pipe and the housing for choking leakage flow past the sealing ring.

In a further preferred embodiment according to the present invention, there is provided a low leakage sealing system for a turbine, comprising a pipe for flowing a heated fluid medium, a housing surrounding the pipe and spaced radially outwardly of the pipe defining an annular space therewith and first and second carrier rings bearing against one another in the annular space and about the axis, the first and second carrier rings having radially inwardly and outwardly opening cavities, respectively, a sealing ring disposed in each cavity and bearing in sealing relation against the pipe and the housing, respectively, the carrier rings having axially adjoining sealing surfaces.

DETAILED DESCRIPTION OF THE INVENTION

Figure 1:
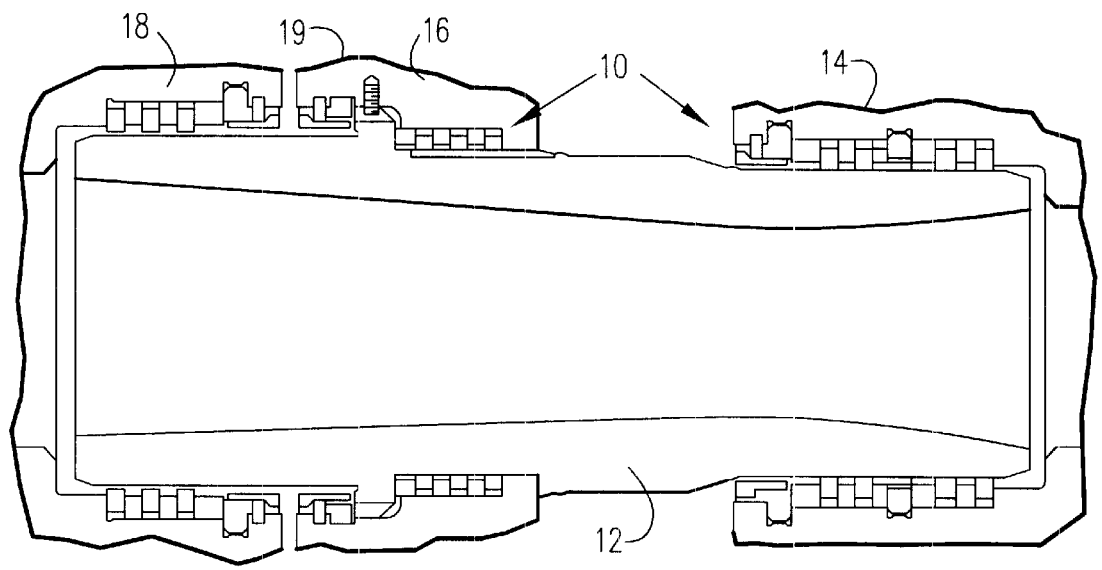
FIG. 1 is a side representational view of a steam inlet pipe or snout surrounded by an outer shell, an inner shell and a nozzle box and a sealing system disposed therebetween in accordance with the prior art.
Figure 2:
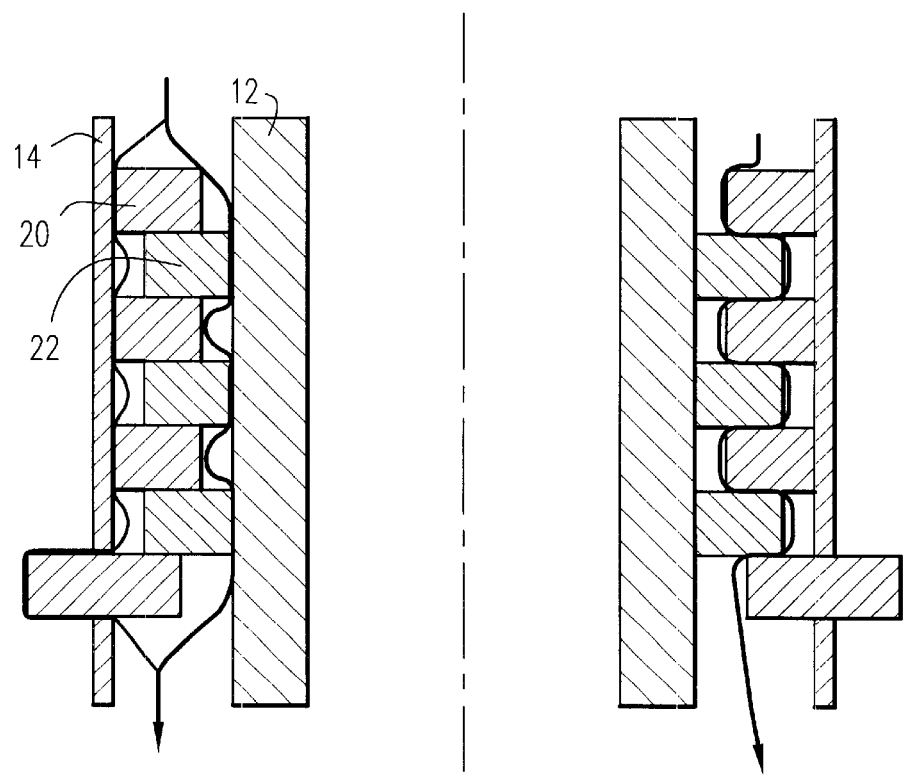
FIG. 2 is an enlarged cross-sectional view of a prior art sealing system illustrating axially stacked sealing rings and leakage paths about the sealing rings.

Referring now to FIG. 1, there is illustrated a sealing system, generally designated 10, between a snout or pipe 12 and an outer shell 14, an inner shell 16 and a nozzle box 18, the shell and box being sometimes individually or collectively referred to as a housing 19. These components form part of a steam turbine in which steam is passed through the snout or pipe 12. A sealing system is required between the pipe or snout and each of the shells 14 and 16 and nozzle box 18, which are movable relative to one another as the steam turbine is brought up to operating temperature. In prior sealing systems, a series of axially stacked sealing rings 20 are disposed between the snout or pipe 12 and the interior walls of the housing 19. For example, as illustrated in FIG. 2, large and small diameter sealing rings 20 and 22, respectively, are axially stacked one against the other and engage the wall of shell 14, on the one hand, and the outer wall of the snout or pipe 12 on the other hand. It will be appreciated, however, that leakage steam flows from the high pressure side toward the low pressure side, i.e., from the top to the bottom of drawing FIG. 2. The leakage paths are thus between the sealing rings 20 and 22 and the walls of the housing, e.g., shell 14 or nozzle box 18, and snout 12. On the right-hand side of FIG. 2 is illustrated a similar arrangement of sealing rings with a potential leakage path between the opposed axial sealing faces of the sealing rings. The potential leakage paths in both the left and right sides of FIG. 2 are illustrated by the heavy, solid black lines.

Figure 3:
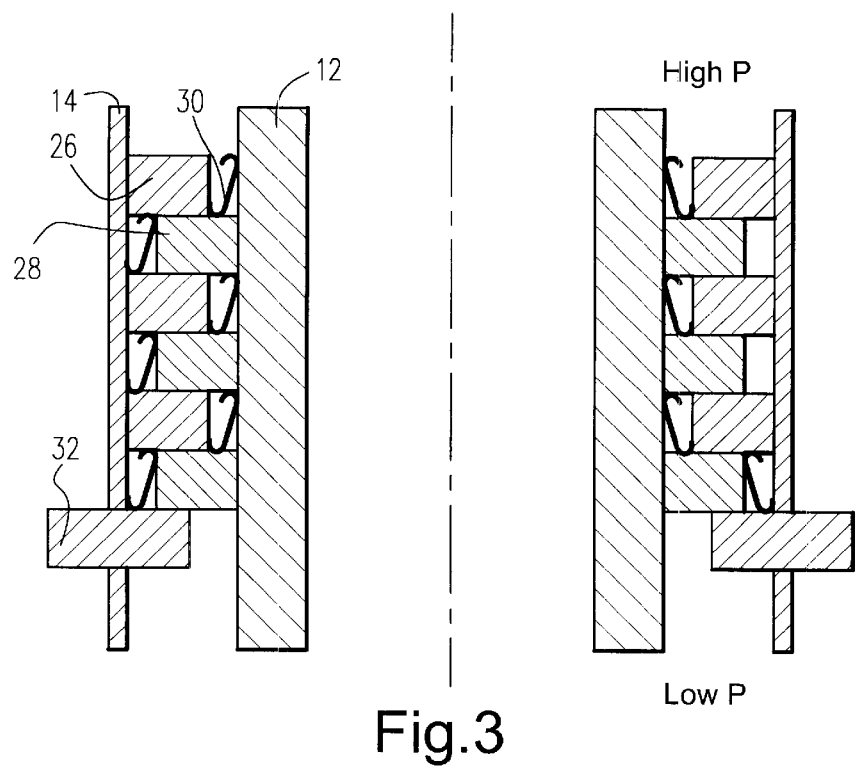
FIG. 3 is a view similar to FIG. 2 illustrating a low leakage sealing system according to a preferred embodiment of the present invention.
Figure 4:
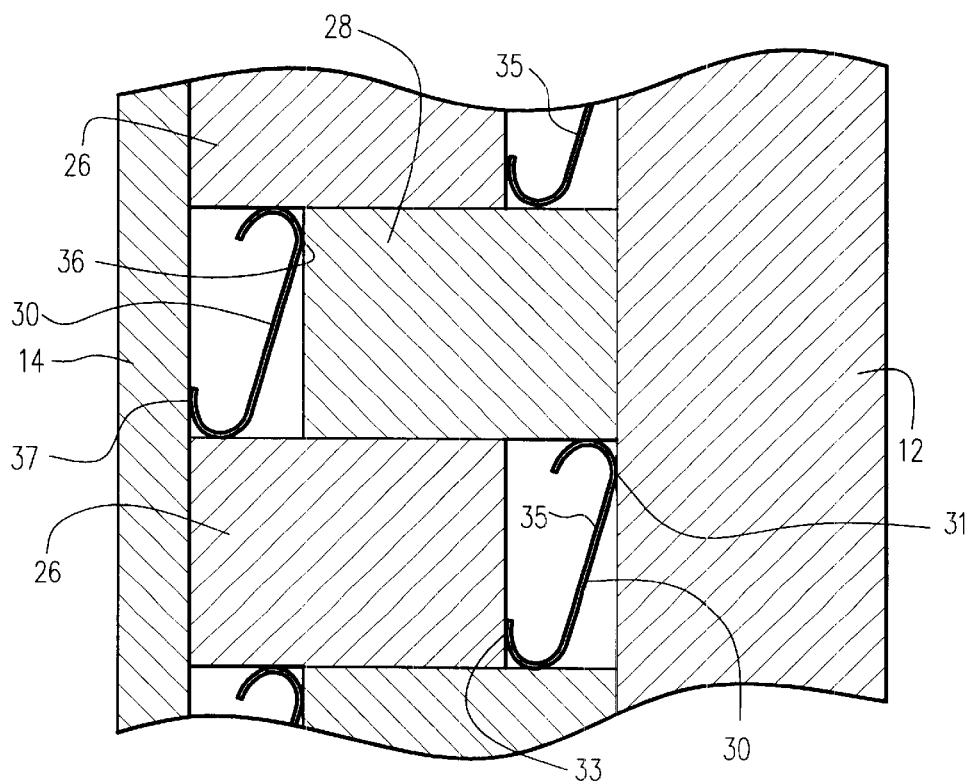
FIG. 4 is an enlarged view of the sealing system of FIG. 3.

Referring now to FIG. 3, there is illustrated a snout sealing system constructed in accordance with a preferred embodiment of the present invention for reducing the leakage flow. In this form of the present invention, large diameter and small diameter sealing rings 26 and 28, respectively, are stacked one against the other with axial sealing faces therebetween. The sealing rings 26 and 28 extend in the annular space between the housing and snout or pipe and between high and low pressure sides of the seal as illustrated in FIG. 3. In the radial plane of each sealing ring, a frustoconical secondary sealing element 30 is provided for bearing against the exposed radial face of the adjacent sealing ring and the contiguous wall of the shell (nozzle box) or snout (pipe). Preferably, the frustoconical sealing element 30 has a generally C-shaped cross-sectional configuration. The primary sealing surfaces between the sealing elements 30 and the sealing rings and walls of the shell (nozzle box) or snout lie in the radial plane of the sealing elements 30 and sealing rings 26 and 28. For example, each of the sealing elements 30 inside sealing rings 26 as depicted in FIG. 4 has primary curved sealing end surfaces 31 bearing against the outer wall surface of snout 12 and a primary curved end sealing surface 33 at its opposite end bearing radially outwardly against the exposed radial inner face of the sealing ring 26. The annular end surfaces are preferably rolled surfaces. The sealing elements 30 thus have a frustoconical body 35 intermediate their opposite curved end surfaces. Similarly, the frustoconical, generally C-shaped sealing element 30 outside sealing rings 28 has primary curved end sealing surfaces 36 and 37 at opposite ends for sealing against the radially outer exposed face of the sealing ring 28 and the wall of the shell 14, respectively. The sealing elements 30 alternate similarly as the sealing rings alternate and lie in radial planes therewith. A final sealing ring 32 (FIG. 3) is fixed on the low pressure side of the sealing system, forming a stop for the stacked sealing rings and elements. On the high pressure side, there is provided a similar stop or flange to maintain the sealing rings and frustoconical elements in axial juxtaposition.

In a preferred form hereof, the small diameter sealing rings 28 have a coefficient of thermal expansion less than the coefficient of thermal expansion of the snout 12. The large diameter sealing rings 26 have substantially the same coefficient of thermal expansion as the coefficient of thermal expansion of the shells 14 or 16 and nozzle box 18. It will be appreciated that the sealing rings 26 and 28 and secondary sealing elements 30 lie loose within the confines of the snout 12 and housing 19 in the cold state of the turbine. As the turbine heats up to operating temperature, the sealing rings, sealing elements 30 and walls 12 and 14 expand such that the seals tightly engage the opposite sealing surfaces. For example, the sealing rings 28 expand radially less than the radial expansion of snout 12 and, consequently, seal tight against one another. The sealing rings 26 expand radially with the housing 19 and maintain sealing engagement therebetween. At operating temperature, sealing surface 31 of the sealing element 30 minimizes, i.e., chokes any leakage flow between the element 30 and the snout wall 12. At the opposite end of element 30, sealing surface 33 seals against the radial inward inner face of the large diameter sealing ring 26. Similarly, the sealing surface 36 between sealing element 30 and the small diameter sealing ring 28 chokes leakage flow therebetween. The sealing surface 37 likewise chokes leakage flow between the shell or nozzle box and the sealing element 30. The engagement of the sealing elements 30 with the axial faces of the sealing rings also provides a tertiary seal. Consequently, the sealing elements 30 choke leakage flow that escapes past the sealing rings and constitutes a fail-safe design in that, should the secondary seals 30 fail, the primary seal formed by the sealing rings remains in effect to maintain relatively low leakage flow levels.

Figure 5:
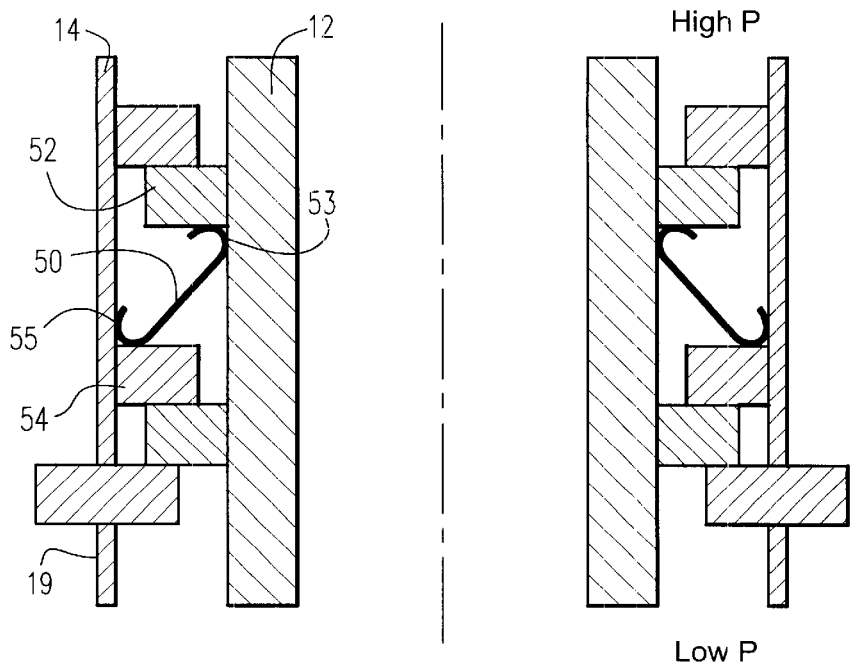
FIG. 5 is a fragmentary side elevational view of a further form of sealing system in accordance with a preferred embodiment of the present invention.

Referring now to FIG. 5, there is illustrated a frustoconical, generally C-shaped secondary sealing element 50 which extends directly between the opposite walls of the snout sealing system. The sealing element 50 is disposed between a pair of axially spaced sealing rings, i.e., a smaller diameter ring 52 and a larger diameter ring 54. As in the prior embodiment, the coefficient of thermal expansion of the smaller diameter ring 52 is less than the coefficient of thermal expansion of the snout 12. The coefficient of thermal expansion of the larger diameter ring 54 is substantially the same as the coefficient of thermal expansion of the housing 19, e.g., shell 14. The smaller diameter end of the frustoconical element 50 faces the high pressure end of the sealing system and its curved primary sealing surface 53 engages the outer wall of the snout 12. The other primary sealing surface 55 at the opposite curved end of the sealing element 50 engages the inner wall surface of the shell 14. Consequently, any leakage paths between the sealing rings and the walls of the snout and shells or nozzle box and the axial facing surfaces of the sealing rings are choked.

Figure 6:
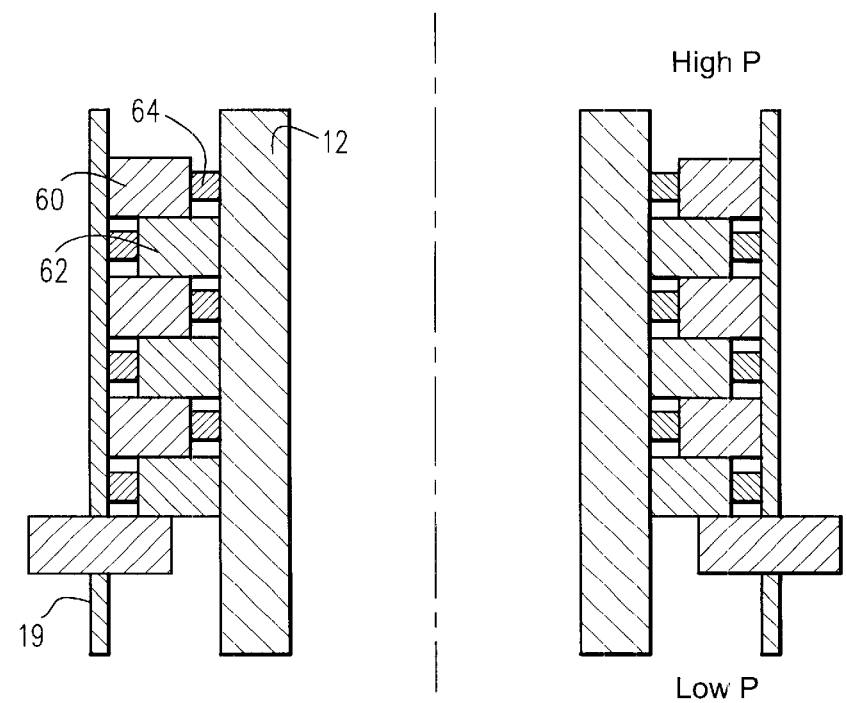
FIG. 6 is a view similar to FIG. 5 illustrating a still further form of the present invention.

Referring now to the embodiment hereof illustrated in FIG. 6, there is illustrated a series of large and small diameter sealing rings 60 and 62, respectively, similarly as in the preceding embodiments. In this form, however, the sealing elements comprise piston rings 64 extending between the radially exposed surfaces of the sealing rings and the opposing walls of the snout and shells or nozzle box as applicable. That is, piston rings 64 are disposed in the annular spaces formed between the sealing rings and the housing. The piston rings 64 thus choke any leakage flows between the sealing rings and the walls of the snout and shells or nozzle box.

Figure 7:
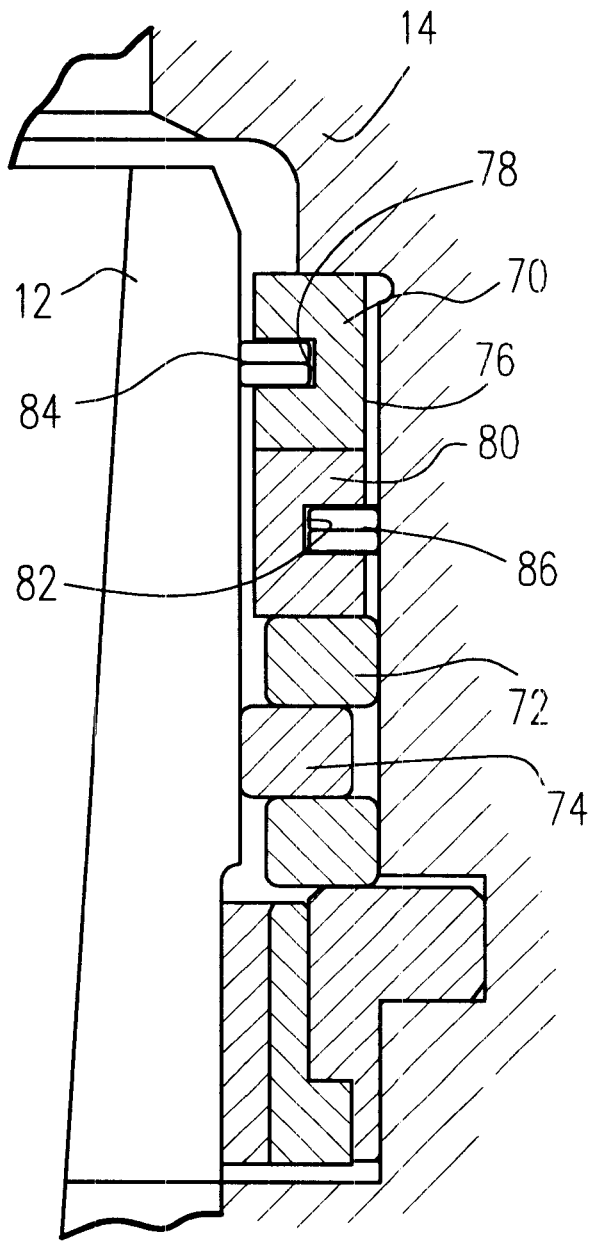
FIG. 7 is a cross-sectional view illustrating a further embodiment of the present invention.

Referring now to the embodiment hereof illustrated in FIG. 7, the low leakage snout sealing system hereof may also comprise a plurality of axially stacked and facing piston ring carriers 70 in combination with large and small diameter sealing rings 72 and 74, respectively. The sealing rings 72 and 74 are similar to the sealing rings illustrated and described in the preceding embodiments. The piston ring carriers 70 have alternating cavities opening in radially inward and outward directions, respectively. For example, the uppermost piston ring carrier 76 has a radially inward opening cavity 78. The next lower piston ring carrier 80 has a radially outwardly opening cavity 82. The cavity 78 receives an inner piston ring or rings 84 for bearing against the outer wall of the snout 12. The piston ring or rings 86 is/are disposed in the cavity 82 for bearing against the wall of one of the shells 14 or 16 or a nozzle box. The piston ring carriers also seal with one another along axially engaged surfaces. Additionally, the piston rings 84 and 86 have axially downstream sealing faces with the upstream axial faces of the cavities 78 and 82, respectively. Thus, the primary sealing between the sealing rings 72 and 74 and the snout and shells or nozzle box is augmented by the low leakage flow sealing system provided by the carriers and piston rings.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A low leakage sealing system for a turbine comprising:
a pipe for flowing a heated fluid medium;
a housing surrounding said pipe and spaced radially outwardly of said pipe defining an annular space therewith;
a plurality of large and small-diameter sealing rings alternately disposed in said annular space about said axis for engagement with respective surfaces of said housing and said pipe to form seals therewith;
said sealing rings engaging one another in an axial direction to form seals along adjoining axial faces thereof; and
at least one element disposed between one of said sealing rings and one of said pipe and said housing for choking leakage flow past said sealing ring; wherein said one element comprises a generally frustoconical annulus.

2. A system according to claims 1 wherein said element is disposed radially of said one sealing ring and between said one sealing ring and one of said pipe and said housing.

3. A system according to claim 1 including a plurality of said elements disposed alternately between said sealing rings and said pipe and said housing, each said element being disposed radially between a sealing ring and one of said pipe and said housing.

4. A system according to claim 3 wherein each said element comprises an intermediate frustoconical body and opposite annular end surfaces curved in a radial direction.

5. A system according to claim 1 wherein said element engages at opposite ends between said pipe and said housing.

6. A system according to claim 5 wherein said element engages between axially adjacent sealing rings.

7. A system according to claim 6 wherein said axially adjacent sealing rings lie in contact with said housing and said pipe, respectively.

8. A system according to claim 1 wherein said one element seals between axially adjacent sealing rings.

9. A low leakage sealing system for a turbine comprising:
a pipe for flowing a heated fluid medium;
a housing surrounding said pipe and spaced radially outwardly of said pipe defining an annular space therewith;
a plurality of large and small-diameter sealing rings alternately disposed in said annular space about said axis for engagement with respective surfaces of said housing and said pipe to form seals therewith;
said sealing rings engaging one another in an axial direction to form seals along adjoining axial faces thereof; and
at least one element disposed between one of said sealing rings and one of said pipe and said housing for choking leakage flow past said sealing ring; wherein said one element comprises a generally frustoconical annulus having an intermediate frustoconical body and opposite annular end surfaces curved in a radial direction.

10. A system according to claim 4 wherein said end surfaces curve in a radial outward direction.

11. A system according to claim 9 wherein said annulus has a generally C-shaped cross-section.

\* \* \* \* \*

UNITED STATES PATENT AND TRADEMARK OFFICE
CERTIFICATE OF CORRECTION

PATENT NO.   : 6,454,270 B1
DATED        : September 24, 2002
INVENTOR(S)  : Chi et al.

It is certified that error appears in the above-identified patent and that said Letters Patent is hereby corrected as shown below:

<u>Column 6,</u>
Line 57, delete "claim 4" and insert -- claim 9 -- therefor.

Signed and Sealed this

Eighth Day of April, 2003

JAMES E. ROGAN
*Director of the United States Patent and Trademark Office*